US011410064B2

(12) United States Patent
Kobayashi et al.

(10) Patent No.: US 11,410,064 B2
(45) Date of Patent: Aug. 9, 2022

(54) AUTOMATED DETERMINATION OF EXPLANATORY VARIABLES

(71) Applicant: INTERNATIONAL BUSINESS MACHINES CORPORATION, Armonk, NY (US)

(72) Inventors: Hiromi Kobayashi, Setagaya-ku (JP); Masaharu Sakamoto, Yokohama (JP); Yasue Makino, Sumida-ku (JP); Hirokazu Kobayashi, Setagaya-ku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 439 days.

(21) Appl. No.: 16/742,876

(22) Filed: Jan. 14, 2020

(65) Prior Publication Data
US 2021/0216895 A1    Jul. 15, 2021

(51) Int. Cl.
*G06N 7/00* (2006.01)
*G06N 20/20* (2019.01)
*G06N 5/04* (2006.01)

(52) U.S. Cl.
CPC .............. *G06N 7/005* (2013.01); *G06N 5/04* (2013.01); *G06N 20/20* (2019.01)

(58) Field of Classification Search
CPC ........... G06N 7/005; G06N 20/20; G06N 5/04
See application file for complete search history.

(56) References Cited

U.S. PATENT DOCUMENTS 8,682,813 B2 * 3/2014 Yuta .................... G06K 9/6256
703/12

FOREIGN PATENT DOCUMENTS

| JP | 2016004525 A | 1/2016 | |
| JP | 2019101833 A | 6/2019 | |
| KR | 2004111456 A * | 12/2004 | ............. G16B 25/00 |
| WO | 2018124170 A1 | 7/2018 | |

OTHER PUBLICATIONS

IBM Corporation, "IBM SPSS Modeler 18.2—Algorithms Guide", © 2018, 806 pp. [Submitted as Part A & B].

(Continued)

*Primary Examiner* — Henry Tsai
*Assistant Examiner* — John B Roche
(74) *Attorney, Agent, or Firm* — Konrad Raynes Davda & Victor LLP; Rabindranath Dutta

(57) ABSTRACT

A determination is made of an explanatory variable with respect to an objective variable. A subset of data from data to be analyzed is created, in response to setting the objective variable to be analyzed to perform analysis. Association analysis is applied to analysis results, in response to a number of analysis runs exceeding a predetermined number. An association rule is derived for the explanatory variable from a result of the association analysis. An explanatory variable having a relevance value greater than a threshold value with the objective variable in the data to be analyzed is selected. The selected explanatory variable is scored as an input using the association rule to determine whether the explanatory variable is to be added or removed.

20 Claims, 10 Drawing Sheets

(56) References Cited

OTHER PUBLICATIONS

Kaushik, S., Introduction to Feature Selection Methods with an Example (or How to Select the Right Variables?), [online], Retrieved on Jan. 27, 2020, Retrieved from the Internet at <URL: https://www.analyticsvidhya.com/blog/2016/12/introduction-to-feature-selection-methods-with-an-example-or-how-to-select-the-right-variables/>, 13 pp.
Wikipedia, "Bundle (Bundle Theory)", [online], Last Updated Sep. 22, 2019, Retrieved from the Internet at <URL: https://ja.wikipedia.org/w/index.php?title=lattice_ (lattice) & oldid = 74339641>, 12 pp. [Machine Translation].
Wikipedia, "Lattice (Order)", [online], Last Edited Jan. 12, 2020, Retrieved from the Internet at <URL: https://en.wikipedia.org/w/index.php?title=Lattice_(order)&oldid=935351018>, 14 pp.
Abstract and Machine Translation of JP Publication No. 2016004525, published Jan. 12, 2016, 13 pp.
Abstract and Machine Translation of JP Publication No. 2019101833, published Jun. 24, 2019, 17 pp.
Abstract and Machine Translation of WO Publication No. 2018124170, published Jul. 5, 2018, 18 pp.
Aotamasaki, "Summary of Feature Selection Method", [online] Blog Entry Dated Apr. 18, 2018, [Retrieved on Jan. 14, 2020], Retrieved from the Internet at <URL: https://aotamasaki.hatenablog.com/entry/2018/04/18/201127>, 10 pp. [Machine Translation].
Blanchet, F.G., et al., "Forward Selection of Explanatory Variables", Ecology 89(9), 2008, 24 pp.

\* cited by examiner

FIG. 3A

Analytic runs on sample dataset — 302

| Analytical run | First run | Second run | Third run — 308 | Fourth run — 304 | Fifth run — 306 |
|---|---|---|---|---|---|
| Linear correlation | 0.834 | 0.792 | 0.652 | 0.827 | 0.799 |
| Explanatory variable 1 | Age | Age | Age | Age | Age |
| Explanatory variable 2 | Address | Address | Address | Address | Address |
| Explanatory variable 3 | Income | Income | Employment | Income | Employment |
| Explanatory variable 4 | Education | Employment | Calling card | Employment | Calling card |
| Explanatory variable 5 | Employment | Free call | Monthly card usage | Free call | Monthly call billing |
| Explanatory variable 6 | Calling card | Wireless usage | Total call billing | Calling card | Monthly device usage |
| Explanatory variable 7 | Monthly call billing | Monthly call billing | Total device usage | Wireless usage | Monthly card usage |
| Explanatory variable 8 | Monthly card usage | Monthly card usage | Total card usage | Monthly call billing | Total call billing |
| Explanatory variable 9 | Monthly wireless usage | Monthly wireless usage | Total wireless usage | Monthly device usage | Total device usage |
| Explanatory variable 10 | Total call billing | Total call billing | Pager | Monthly card usage | Total card usage |
| Explanatory variable 11 | Total device usage | Total device usage | log free call | Monthly wireless usage | Total wireless usage |
| Explanatory variable 12 | Total card usage | Total card usage | log device | Total call billing | Three phone |
| Explanatory variable 13 | Total wireless usage | Total wireless usage | log card | Total device usage | log free call |
| Explanatory variable 14 | log free call | Multiple lines | log wireless | Total card usage | log device |
| Explanatory variable 15 | log device | Pager | Cancel | Total wireless usage | log card |
| Explanatory variable 16 | log card | log free call | | Multiple lines | log wireless |
| Explanatory variable 17 | log wireless | log device | | Pager | |
| Explanatory variable 18 | In income | log card | | Catch | |
| Explanatory variable 19 | Cancel | log wireless | | Call transfer | |
| Explanatory variable 20 | | In income | | log free call | |
| Explanatory variable 21 | | Customer | | log device | |
| Explanatory variable 22 | | | | log card | |
| Explanatory variable 23 | | | | log wireless | |
| Explanatory variable 24 | | | | In income | |
| Explanatory variable 25 | | | | Customer | |

FIG. 3B

| Sixth run 0.643 | Seventh run 0.753 | Eighth run 0.699 | Ninth run 0.768 | Tenth run 0.801 |
|---|---|---|---|---|
| Age | Address | Area | Income | Address |
| Address | Income | Age | Calling card | Income |
| Employment | Employment | Address | Monthly call billing | Employment |
| The number of people per household | Calling card | Income | Monthly card usage | Monthly call billing |
| Monthly call billing | Monthly call billing | Employment | Total call billing | Monthly device usage |
| Monthly device usage | Monthly card usage | Calling card | Total device usage | Monthly card usage |
| Monthly card usage | Monthly wireless usage | Wireless usage | Total card usage | Monthly wireless usage |
| Monthly wireless usage | Total call billing | Monthly call billing | Total wireless usage | Total call billing |
| Total call billing | Total device usage | Monthly device usage | log free call | Total device usage |
| Total device usage | Total card usage | Monthly card usage | log device | Total card usage |
| Total card usage | Total wireless usage | Monthly wireless usage | log card | Total wireless usage |
| Total wireless usage | Multiple lines | Total call billing | In income | log free call |
| Voice | log free call | Total device usage | | log device |
| log free call | log device | Total card usage | | log card |
| log device | log card | Total wireless usage | | log wireless |
| log card | log wireless | Call ID | | In income |
| log wireless | In income | Three phone | | |
| | Customer | log free call | | |
| | | log device | | |
| | | log card | | |
| | | log wireless | | |
| | | In income | | |
| | | Cancel | | |

AUTOMATED DETERMINATION OF EXPLANATORY VARIABLES

BACKGROUND

1. Field

Embodiments relate to the automated determination of explanatory variables.

2. Background

In statistical modeling and experimental sciences in which machine learning mechanisms may be used, the values of dependent variables may depend on the values of independent variables. The dependent variables may represent the output whose variation is being studied. The independent variables represent inputs or causes that may cause the variation.

An explanatory variable is a type of independent variable. When a variable is independent, it is not affected at all by any other variables. When a variable is not independent for certain, the variable is an explanatory variable.

For example, there may be two variables to explain weight gain: fast food and soda. However, fast food intake and drinking soda are not independent of each other, because many fast food outlets may encourage customers to buy a soda with a meal. Although these variables are not completely independent of each other, they do have an effect on weight gain. Variables representing food and soda are called explanatory variables because they may offer some explanation for the weight gain.

The response variable is a dependent variable that may be the focus of a question in a study or experiment that generates a dataset. An explanatory variable is a variable that explains changes in the response variable. A machine learning application may use historical data to learn patterns and uncover relationships between other features of the dataset and the response variable. The response variable may also be referred to as a target variable or an objective variable.

Association rule learning or association analysis may be a rule-based machine learning mechanism for discovering interesting relations between variables. Association analysis is intended to identify strong rules discovered in databases using some measures of interestingness. Association analysis is useful for discovering interesting relationships hidden in large data sets. The uncovered relationships may be represented in the form of association rules or sets of frequent items.

SUMMARY OF THE PREFERRED EMBODIMENTS

Provided are a method, a system, and a computer program product in which a determination is made of an explanatory variable with respect to an objective variable. A subset of data from data to be analyzed is created, in response to setting the objective variable to be analyzed to perform analysis. Association analysis is applied to analysis results, in response to a number of analysis runs exceeding a predetermined number. An association rule is derived for the explanatory variable from a result of the association analysis. An explanatory variable having a relevance value greater than a threshold value with the objective variable in the data to be analyzed is selected. The selected explanatory variable is scored as an input using the association rule to determine whether the explanatory variable is to be added or removed.

In certain embodiments, if the explanatory variable has a score exceeding a predetermined value then the explanatory variable is added.

In further embodiments, if the explanatory variable is added then the added explanatory variable improves a measure of the objective variable.

In certain embodiments, if the explanatory variable has a score that is lower than a predetermined value then the explanatory variable is deleted.

In additional embodiments, if the explanatory variable is added then remaining explanatory variables after the deletion of the explanatory variable improve a measure of the objective variable, wherein the objective variable is a measure of a number of events that have occurred, and explanatory variables include at least an amount billed for the number of events, characteristics of users generating the number of events, and properties of the events.

In further embodiments, the subset of the data is determined at least via decision tree analysis, wherein the number of events corresponds to a volume of telephonic communications, wherein the characteristics of the users include age, address, education level, and wherein the properties include number of lines and wireless usage.

In yet further embodiments, the decision tree analysis is performed by performing operations in which branching of the explanatory variables which best classifies a parent node is repeated until a stopping rule based on a Gini coefficient a reached.

BRIEF DESCRIPTION OF THE DRAWINGS

Referring now to the drawings in which like reference numbers represent corresponding parts throughout:

FIGS. 3A and 3B illustrate a block diagram that shows examples of analytical runs for analysis of a sample dataset, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

Explanatory variables need to be appropriately selected to improve the accuracy in machine learning. Methods of selecting explanatory variables may be based on the relevance between an objective variable and the explanatory variables. Explanatory variables may be selected by incorporating a subset of features into a machine learning algorithm and then determining whether features are to be included or not by classifying whether the subset of features is better or worse than the previous model. Explanatory variables may also be selected by implementing feature selection simultaneously with machine learning. In all such mechanisms for selecting explanatory variables, features are selected from candidates of explanatory variables to be analyzed.

Certain embodiments provide mechanisms to perform association analysis by using examples of sets of explanatory variables used in analysis performed in the past, and by constructing an association rule for the explanatory variables, and then recommending the explanatory variables for addition or deletion. This contributes to an improvement of machine learning mechanisms that execute in a computational device. In certain embodiments the machine learning mechanisms may be applied in certain practical applications to determine an objective variable that is a measure of a number of events that have occurred, where explanatory variables include at least an amount billed for the number of events, characteristics of users generating the number of events, and properties of the events. The number of events may correspond to a volume of telephonic communications, wherein the characteristics of the users include age, address, education level, and wherein the properties include number of lines and wireless usage. As a result, improvements may be made to computer-implemented processes that determine explanatory variables for the occurrences of events such as telephone calls, telephonic communications, etc.

Exemplary Embodiments

Figure 1:
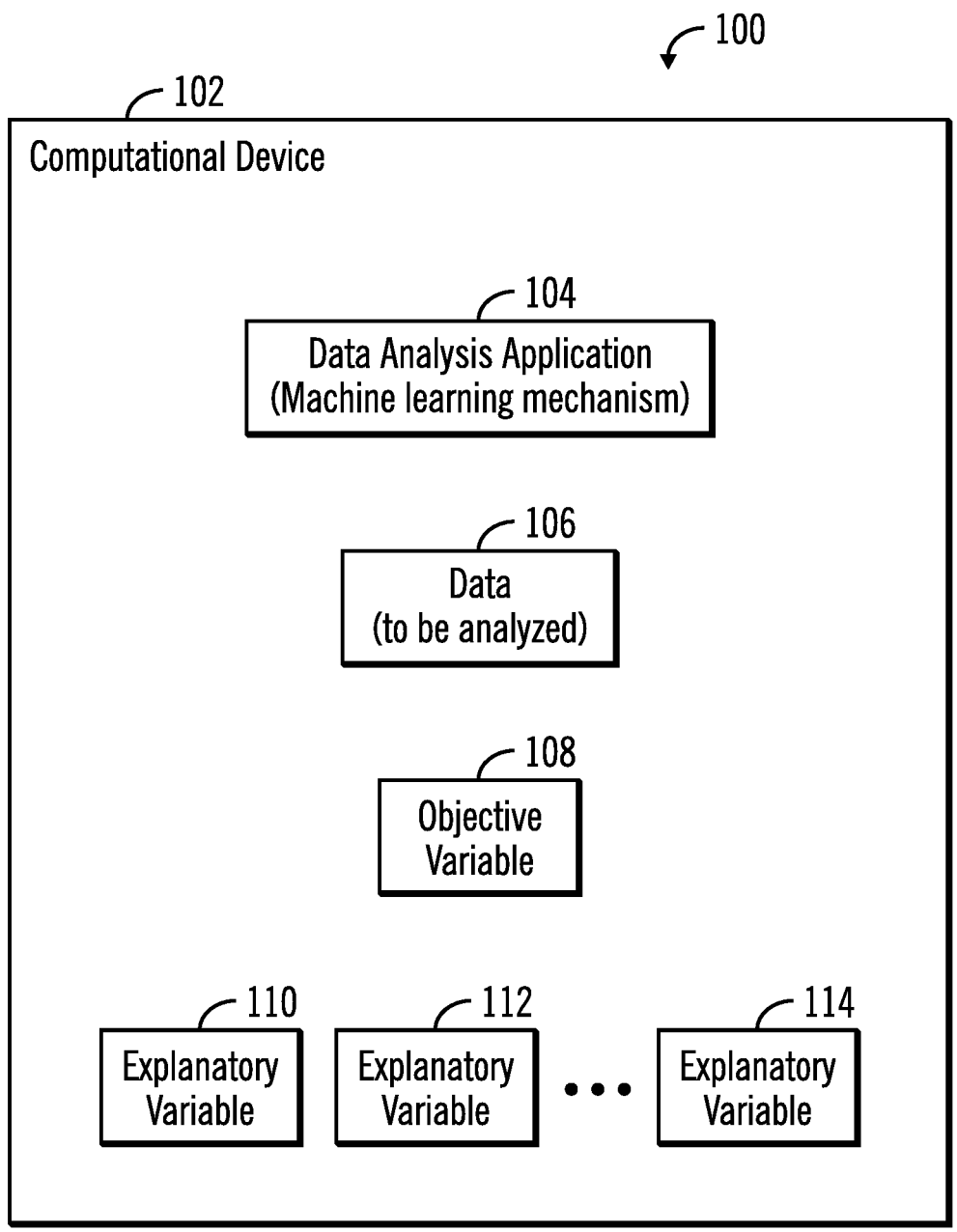
FIG. 1 illustrates a block diagram of a computing environment comprising a host computational device that performs data analysis, in accordance with certain embodiments.

FIG. 1 illustrates a block diagram of a computing environment 100 comprising a computational device 102 that performs data analysis via a machine learning mechanism, in accordance with certain embodiments.

The computational device 102 may be any suitable computational device presently known in the art, such as a personal computer, a workstation, a server, a mainframe, a handheld computer, a telephony device, a network appliance, etc. The computational device 102 may be included in any suitable network, such as, a storage area network, a wide area network, the Internet, an intranet, etc. In certain embodiments, the computational device may be included in a cloud computing environment A data analysis application 104 may execute in the computational device 102. In certain embodiments, the data analysis application 104 may be included in machine learning mechanism. In certain embodiments the machine learning mechanism may be implemented via one or more machine learning techniques such as neural networks, etc.

The data analysis application 104 is used for analyzing data 106 that is stored or accessed by the computational device 102. An objective variable 108 may be defined for the data by a user. The data analysis application 104 analyzes the data and determines the appropriate explanatory variables 110, 112, 114 corresponding to the objective variable 108.

Figure 2:
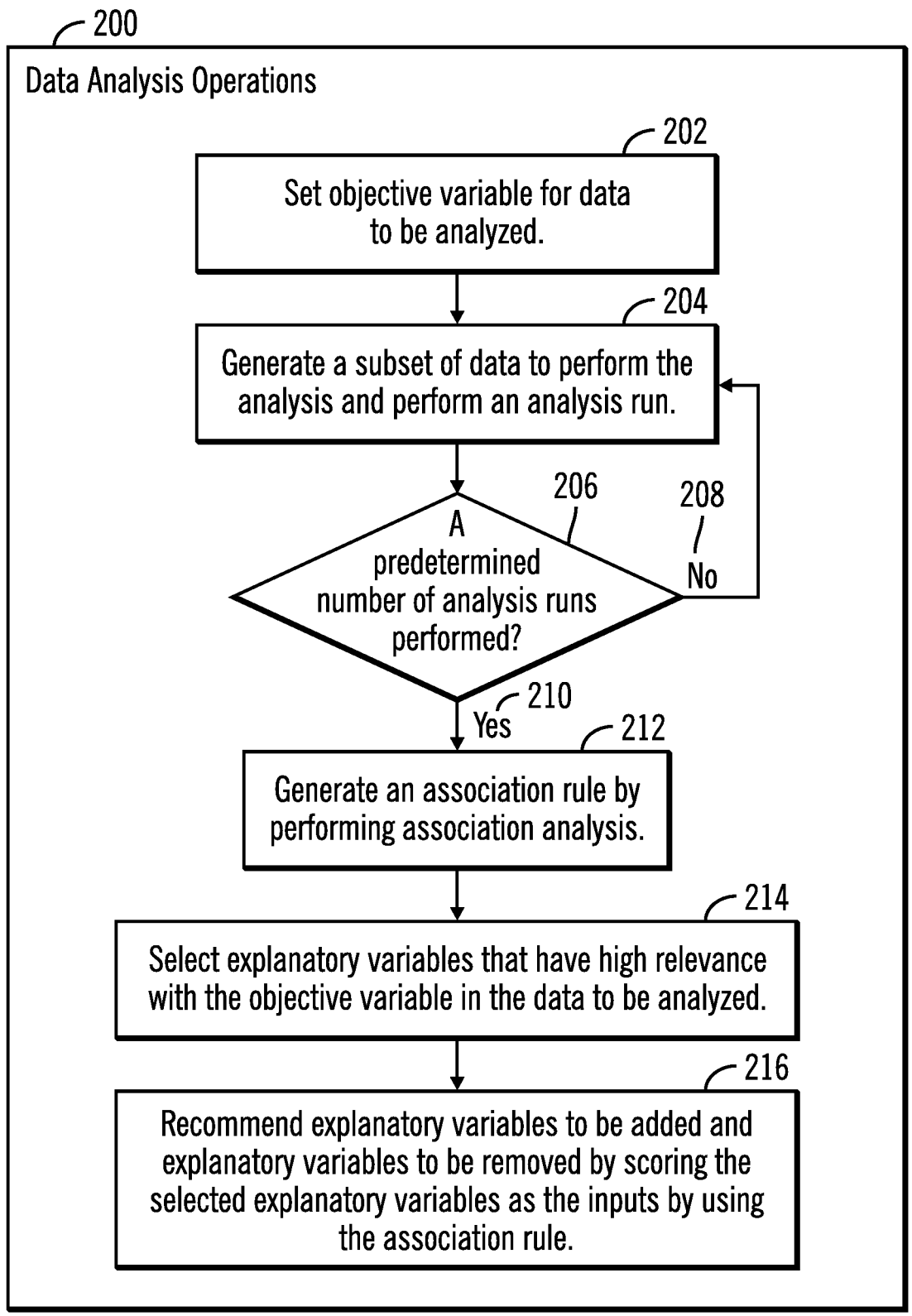
FIG. 2 illustrates a flowchart for performing data analysis operations, in accordance with certain embodiments.

FIG. 2 illustrates a flowchart 200 for performing data analysis operations, in accordance with certain embodiments. In certain embodiments, the operations shown in FIG. 2 may be performed in the computational device 102.

Control starts at block 202 in which the data analysis application 104 sets the objective variable 108 for the data 106 to be analyzed. Control proceeds to block 204 in which the data analysis application 104 generates a subset of the data to perform the analysis and performs an analysis run. An analysis run is an attempt at determining how well a certain set of explanatory variables relate to the objective variable 108.

From block 204 control proceeds to block 206 in which the data analysis application 104 determines whether a predetermined number of analysis runs have been performed. If not ("No" branch 208) control returns to block 204. In other words, at least a predetermined number of analysis runs are executed on the data. The predetermined number may vary from tens to thousands to hundreds of thousands or more.

If at block 206 the data analysis application 104 determines that the predetermined number of analysis runs have been performed ("Yes" branch 210) then control proceeds to block 212 in which an association rule is generated by performing an association analysis. From block 212 control proceeds to block 214 in which the data analysis application 104 selects explanatory variables that have high relevance with the objective variable 108 in the data to be analyzed. The high relevance may be defined as a relevance that exceeds a predetermined threshold measure, such as a predetermined correlation value or some other measure. The data analysis application 104 recommends (at block 216) explanatory variables to be added and the explanatory variables to be removed by scoring the selected explanatory variables as the inputs by using the association rule that was generated in block 212.

FIG. 3A and FIG. 3B illustrate a block diagram 300 that shows examples of analytical runs for analysis of a sample dataset corresponding to the data 106, in accordance with certain embodiments.

An objective variable is defined to be the total long distance call volume and ten analytical runs with various explanatory variables are performed to generate linear correlation values 302 in each run. For example, the fourth run 304 generates the linear correlation value of 0.827 (shown via reference numeral 306). The linear correlation value indicates how well the explanatory variables for the run relates to the objective variable.

It may be noted that the ten analytical runs have different explanatory variables. For example the third run 308 has fifteen explanatory variables, whereas the fourth run 304 has twenty five explanatory variables where the explanatory variables in different runs may be different. Some explanatory variable may be present in one run and absent in another run.

Figure 4:
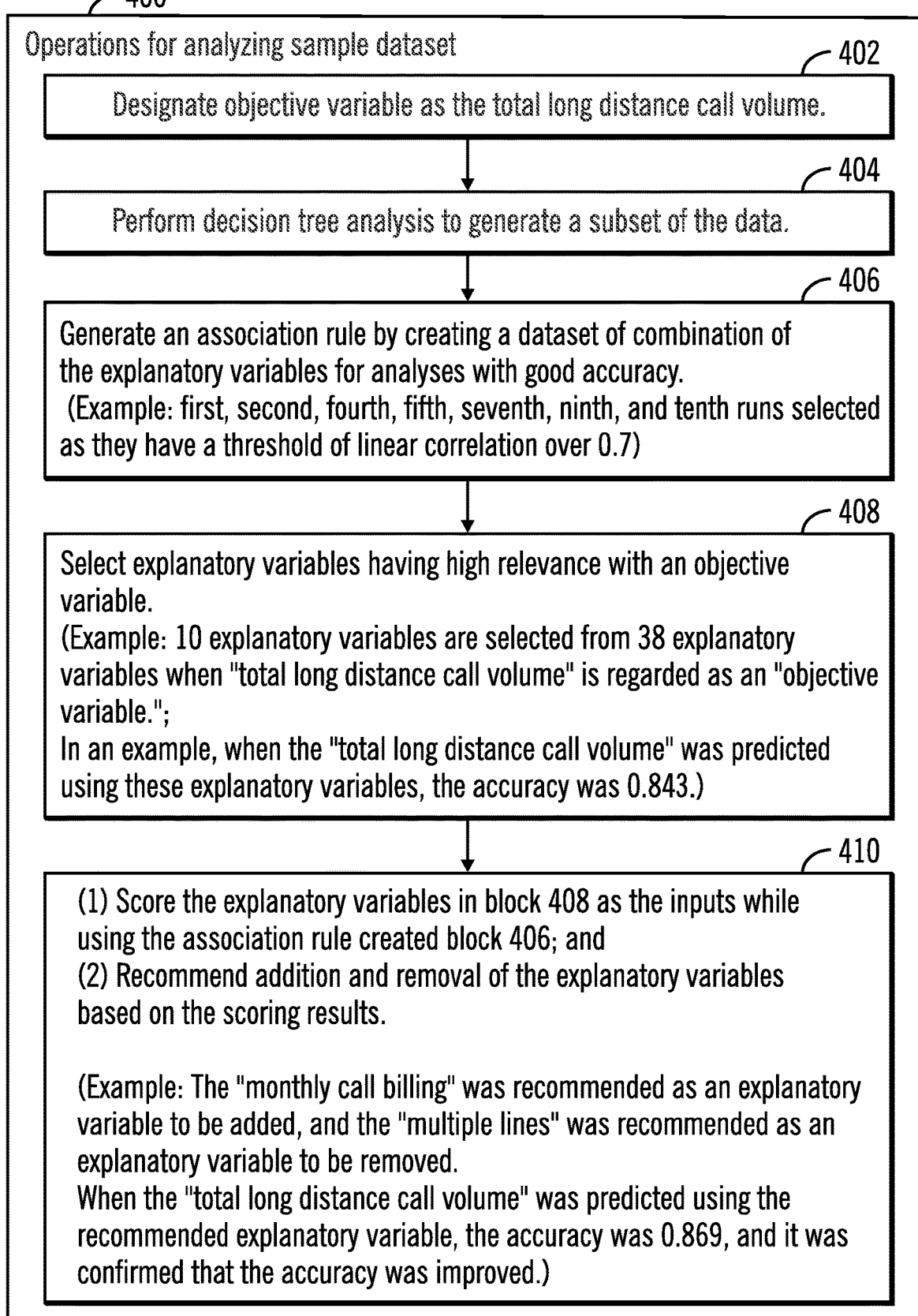
FIG. 4 illustrates a flowchart that shows operations for analyzing the sample dataset, in accordance with certain embodiments.

FIG. 4 illustrates a flowchart 400 that shows operations for analyzing the sample dataset shown in FIG. 3, in accordance with certain embodiments.

Control starts at block 402 in which the data analysis application 104 designates the objective variable 108 as the total long distance call volume. The objective is to determine which explanatory variables best explain the total long distance call volume.

Control proceeds to block 404 in which the data analysis application 104 performs a decision tree analysis to generate a subset of the data. In certain embodiments, the subset of the data is determined via decision tree analysis. Other methods besides decision tree analysis may be used in alternative embodiments. In further embodiments, the decision tree analysis is performed by performing operations in which branching of the explanatory variables which best classifies a parent node is repeated until a stopping rule based on a Gini coefficient is reached. From block 404 control proceeds to block 406 in which the data analysis application 104 generates an association rule by creating a dataset of combination of the explanatory variables for analyses with good accuracy. For example in FIG. 3, the first, second, fourth, fifth, seventh, ninth, and tenth runs are selected as they have a threshold of linear correlation that is over 0.7.

From block 406 control proceeds to block 408 in which the data analysis application selects explanatory variables having high relevance with the objective variable. For example, in certain embodiments for the runs of the dataset shown in FIG. 3, ten explanatory variables are selected from thirty eight explanatory variables when the "total long distance call volume" is regarded the an "objective variable.". In an example, when the "total long distance call volume" was predicted using these explanatory variables, the accuracy provided by the linear correlation was 0.843 which is higher than the linear correlation measure obtained in any of the ten runs. From block 408 control proceeds to block 410 in which the data analysis application 104 first scores the explanatory variables of block 408 as the inputs while using the association rule created in block 406, and then recommends the addition and removal of the explanatory variables based on the scoring results. For example, in certain embodiments, the "monthly call billing" was recommended as an explanatory variable to be added, and the "multiple lines" was recommended as an explanatory variable to be removed. In certain embodiments, when the "total long distance call volume" was predicted using the recommended explanatory variable, the accuracy was 0.869, and it was confirmed that the accuracy was improved.

Figure 5:
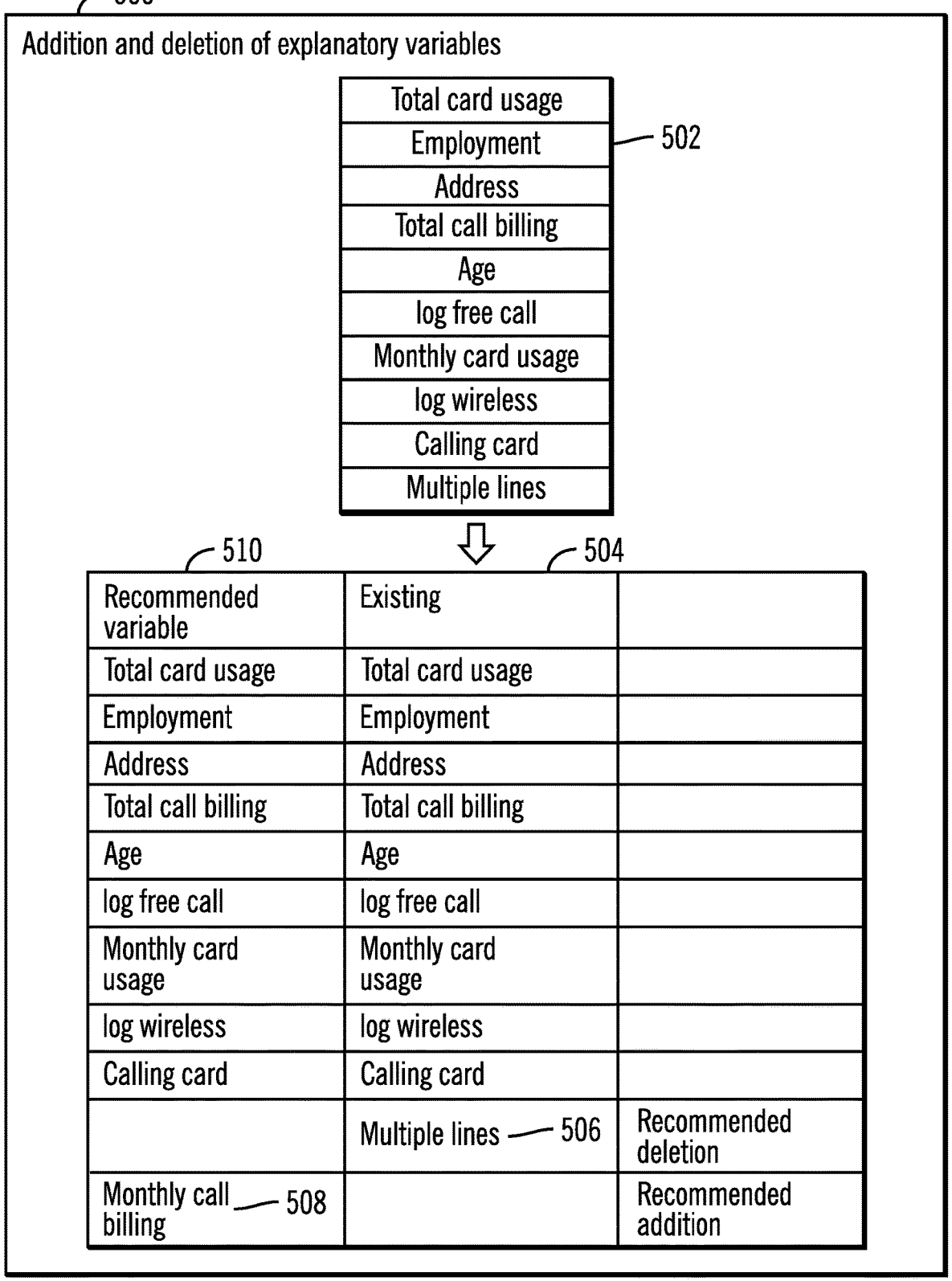
FIG. 5 illustrates a block diagram that shows additions and deletions of explanatory variables for the sample dataset, in accordance with certain embodiments.

FIG. 5 illustrates a block diagram 500 that shows additions and deletions of explanatory variables for the sample dataset, in accordance with certain embodiments.

There are 10 existing explanatory variables (shown via reference numerals 502, 504). In the dataset whose runs are shown in FIG. 3, the explanatory variable "multiple lines" 506 is deleted and the explanatory variable "monthly call billing" 508 is added to generate the set of recommended explanatory variables 510. The explanatory variables 510 provide an improved explanation of the objective variable.

Figure 6:
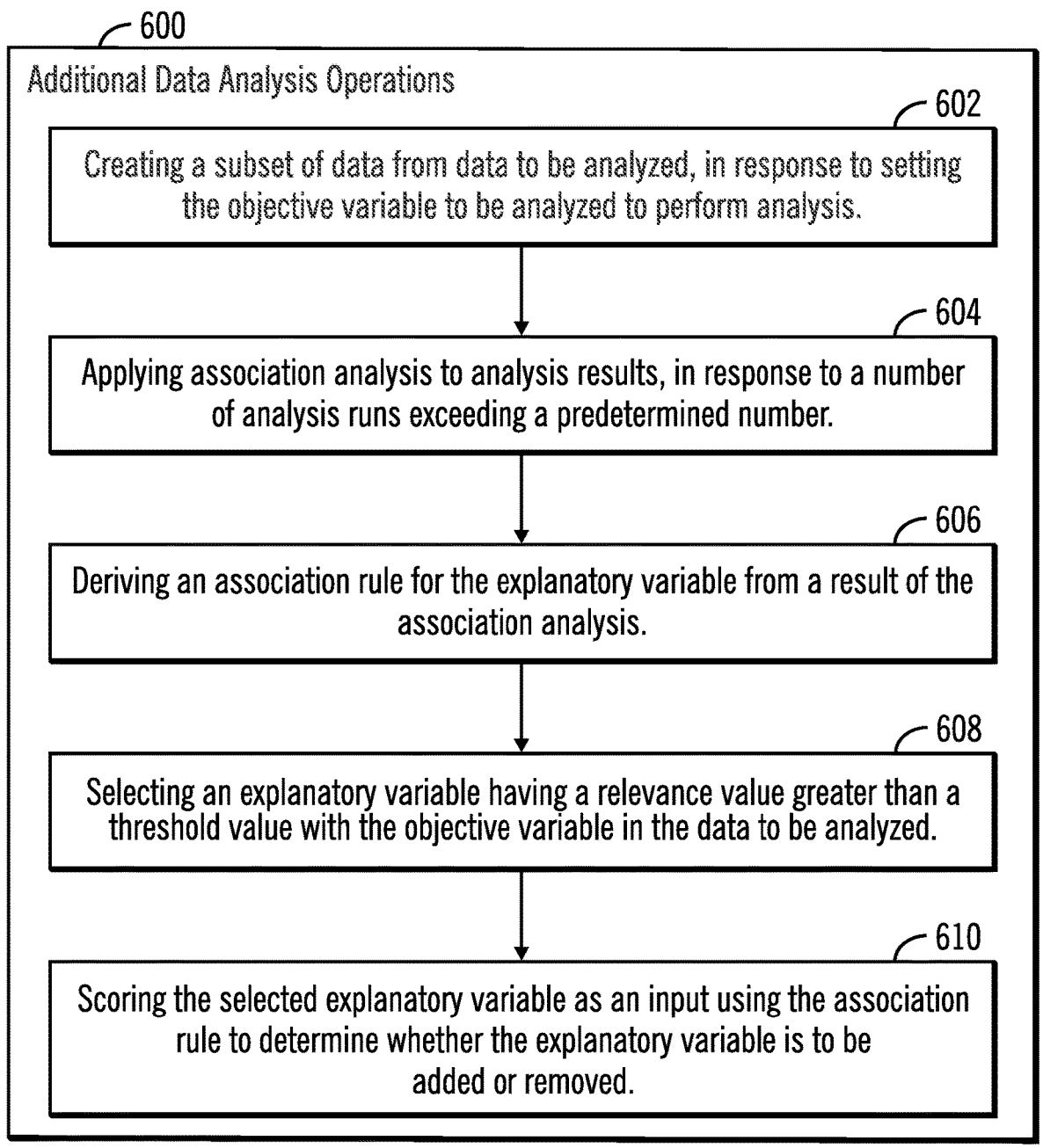
FIG. 6 illustrates a flowchart for performing additional data analysis operations, in accordance with certain embodiments.

FIG. 6 illustrates a flowchart 600 for performing additional data analysis operations, in accordance with certain embodiments. In certain embodiments, the operations shown in FIG. 2 may be performed in the computational device 102. The process shown in FIG. 6 may be used to determine explanatory variables with respect to an objective variable.

Control starts at block 602 in which subset of data from data to be analyzed is created, in response to setting the objective variable to be analyzed, to perform analysis. Association analysis is applied (at block 604) to analysis results, in response to a number of analysis runs exceeding a predetermined number.

From block 604 control proceeds to block 606 in which an association rule is derived for the explanatory variable from a result of the association analysis. An explanatory variable having a relevance value that is greater than a threshold value with the objective variable in the data to be analyzed is selected (at block 608), where the relevance value greater than the threshold value implies that the explanatory variable has a high relevance of with the objective variable. The selected explanatory variable is scored as an input using the association rule to determine (at block 610) whether the explanatory variable is to be added or removed.

In certain embodiments, the objective variable is a measure of a number of events that have occurred, and explanatory variables include at least an amount billed for the number of events, characteristics of users generating the number of events, and properties of the events. The number of events may correspond to a volume of telephonic communications, wherein the characteristics of the users include age, address, education level, and wherein the properties include number of lines and wireless usage, as shown in FIG. 3A and FIG. 3B.

Instead of selecting features from an analysis target and the candidates of the explanatory variables, in the embodiments shown in FIGS. 1-9, all features used in past analyses become candidates, and potential candidates of the explanatory variables useful for analysis is expanded. The analysis can be performed with higher accuracy by aggregating the results obtained from the analyses performed by a plurality of analysts using the same data and the same objective variable.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 7:
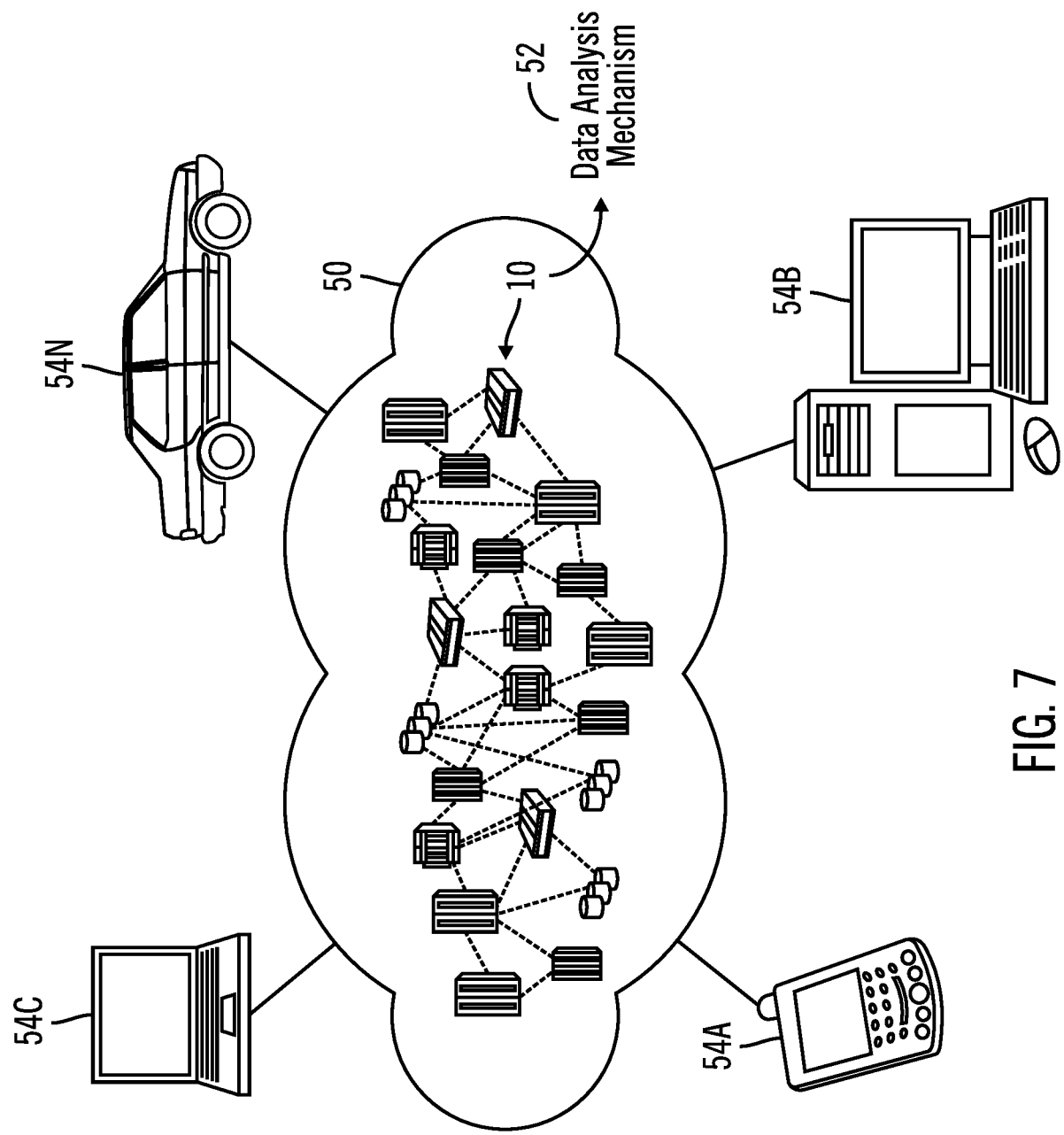
FIG. 7 illustrates a block diagram of a cloud computing environment, in accordance with certain embodiments.

Referring now to FIG. 7 an illustrative cloud computing environment 50 is depicted. Data analysis mechanism (shown via reference numeral 52) is performed in the cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 8:
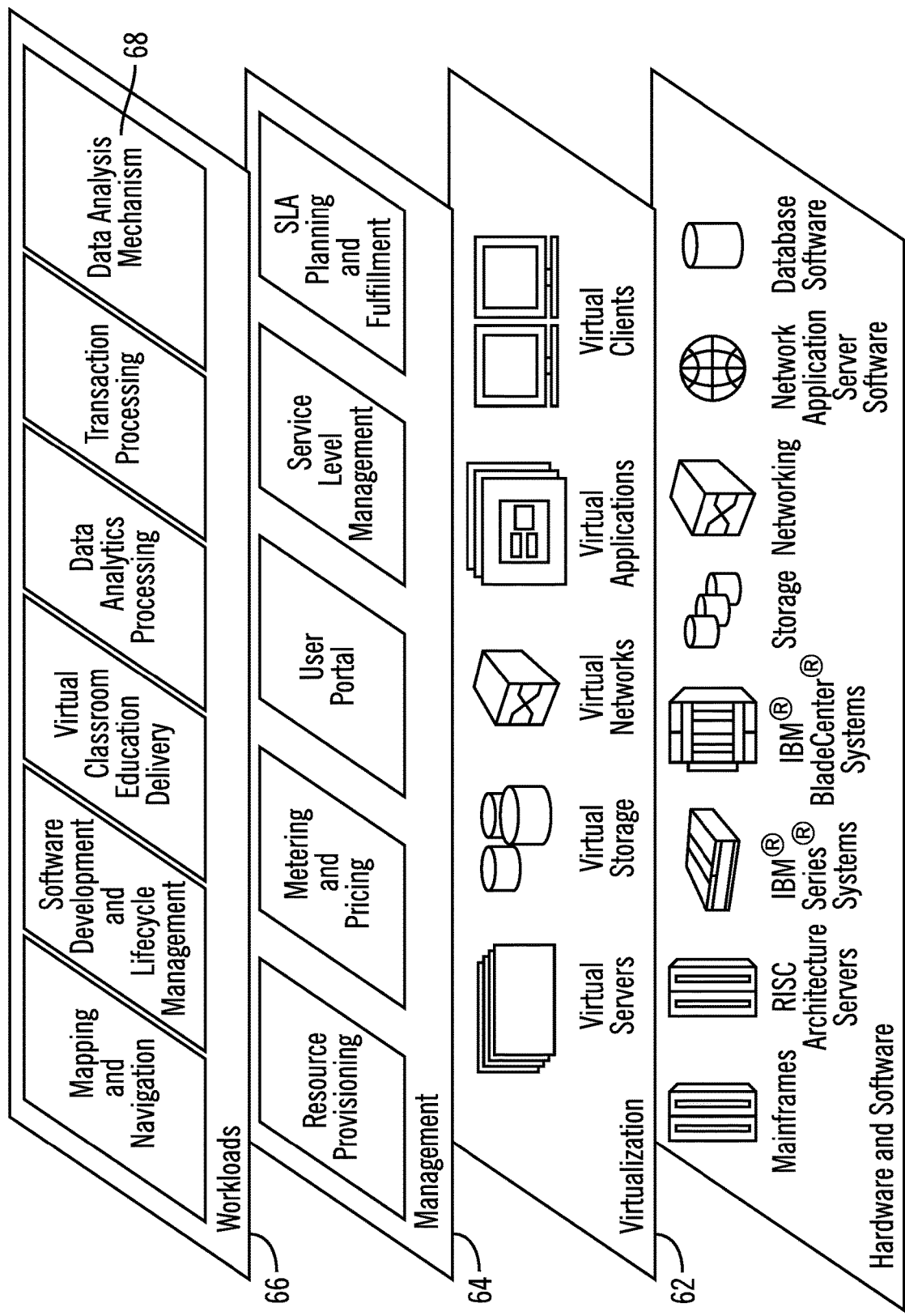
FIG. 8 illustrates a block diagram of further details of the cloud computing environment of FIG. 7, in accordance with certain embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto.

Hardware and software layer 60 includes hardware and software components. Examples of hardware components include mainframes, in one example IBM ZSERIES* systems; RISC (Reduced Instruction Set Computer) architecture based servers, in one example IBM PSERIES* systems; IBM XSERIES* systems; IBM BLADECENTER* systems;

storage devices; networks and networking components. Examples of software components include network application server software, in one example IBM WEBSPHERE* application server software; and database software, in one example IBM DB2* database software.

* IBM, ZSERIES, PSERIES, XSERIES, BLADECENTER, WEBSPHERE, and DB2 are trademarks or registered trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data analysis mechanism 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 9:
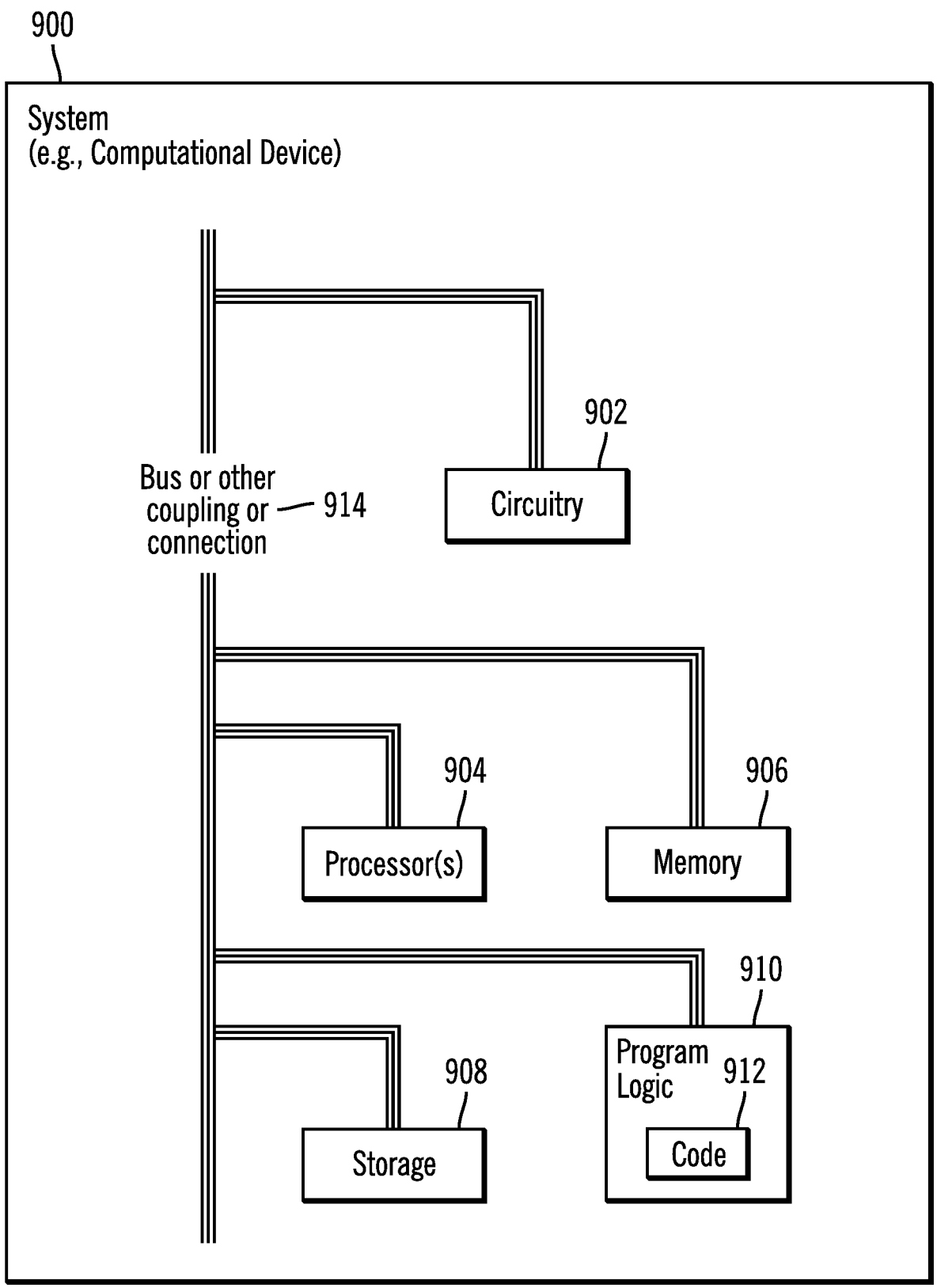
FIG. 9 illustrates a block diagram of a computational system that shows certain elements that may be included in a computational device, as described in FIGS. 1-9, in accordance with certain embodiments.

FIG. 9 illustrates a block diagram that shows certain elements that may be included in the computational device 102 or other devices shown in FIGS. 1-8, in accordance with certain embodiments. The system 900 may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. One or more of the components in the system 900 may communicate via a bus or via other coupling or connection 914. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for determining an explanatory variable with respect to an objective variable, the method comprising:
   creating a subset of data from data to be analyzed, in response to setting the objective variable to be analyzed to perform analysis;
   applying association analysis to analysis results, in response to a number of analysis runs exceeding a predetermined number;
   deriving an association rule for the explanatory variable from a result of the association analysis;
   selecting an explanatory variable having a relevance value greater than a threshold value with the objective variable in the data to be analyzed; and
   scoring the selected explanatory variable as an input using the association rule to determine whether the explanatory variable is to be added or removed.

2. The method of claim 1, wherein if the explanatory variable has a score exceeding a predetermined value then the explanatory variable is added.

3. The method of claim 2, wherein if the explanatory variable is added then the added explanatory variable improves a measure of the objective variable.

4. The method of claim 2, wherein if the explanatory variable has a score that is lower than a predetermined value then the explanatory variable is deleted.

5. The method of claim 4, wherein if the explanatory variable is added then remaining explanatory variables after the deletion of the explanatory variable improve a measure of the objective variable, and wherein:
   the objective variable is a measure of a number of events that have occurred; and
   explanatory variables include at least an amount billed for the number of events, characteristics of users generating the number of events, and properties of the events.

6. The method of claim 5, wherein the subset of the data is determined at least via decision tree analysis, wherein the number of events corresponds to a volume of telephonic communications, wherein the characteristics of the users include age, address, education level, and wherein the properties include number of lines and wireless usage.

7. The method of claim 6, wherein the decision tree analysis is performed by performing operations in which branching of the explanatory variables which best classifies a parent node is repeated until a stopping rule based on a Gini coefficient is reached.

8. A system for determining an explanatory variable with respect to an objective variable, comprising:
   a memory; and
   a processor coupled to the memory, wherein the processor performs operations, the operations comprising:
      creating a subset of data from data to be analyzed, in response to setting the objective variable to be analyzed to perform analysis;
      applying association analysis to analysis results, in response to a number of analysis runs exceeding a predetermined number;
      deriving an association rule for the explanatory variable from a result of the association analysis;
      selecting an explanatory variable having a relevance value greater than a threshold value with the objective variable in the data to be analyzed; and
      scoring the selected explanatory variable as an input using the association rule to determine whether the explanatory variable is to be added or removed.

9. The system of claim 8, wherein if the explanatory variable has a score exceeding a predetermined value then the explanatory variable is added.

10. The system of claim 9, wherein if the explanatory variable is added then the added explanatory variable improves a measure of the objective variable.

11. The system of claim 9, wherein if the explanatory variable has a score that is lower than a predetermined value then the explanatory variable is deleted.

12. The system of claim 11, wherein if the explanatory variable is added then remaining explanatory variables after the deletion of the explanatory variable improve a measure of the objective variable, and wherein:
   the objective variable is a measure of a number of events that have occurred; and
   explanatory variables include at least an amount billed for the number of events, characteristics of users generating the number of events, and properties of the events.

13. The system of claim 12, wherein the subset of the data is determined at least via decision tree analysis, wherein the number of events corresponds to telephonic communications, wherein the characteristics of the users include age, address, education level, and wherein the properties include number of lines and wireless usage.

14. The system of claim 13, wherein the decision tree analysis is performed by performing operations in which branching of the explanatory variables which best classifies a parent node is repeated until a stopping rule based on a Gini coefficient is reached.

15. A computer program product for determining an explanatory variable with respect to an objective variable, the computer program product comprising a computer readable storage medium having computer readable program code embodied therewith, the computer readable program code configured to perform operations, the operations comprising:
   creating a subset of data from data to be analyzed, in response to setting the objective variable to be analyzed to perform analysis;
   applying association analysis to analysis results, in response to a number of analysis runs exceeding a predetermined number;
   deriving an association rule for the explanatory variable from a result of the association analysis;
   selecting an explanatory variable having a relevance value greater than a threshold value with the objective variable in the data to be analyzed; and
   scoring the selected explanatory variable as an input using the association rule to determine whether the explanatory variable is to be added or removed.

16. The computer program product of claim 15, wherein if the explanatory variable has a score exceeding a predetermined value then the explanatory variable is added.

17. The computer program product of claim 16, wherein if the explanatory variable is added then the added explanatory variable improves a measure of the objective variable.

18. The computer program product of claim 16, wherein if the explanatory variable has a score that is lower than a predetermined value then the explanatory variable is deleted.

19. The computer program product of claim 18, wherein if the explanatory variable is added then remaining explanatory variables after the deletion of the explanatory variable improve a measure of the objective variable, and wherein:
   the objective variable is a measure of a number of events that have occurred; and
   explanatory variables include at least an amount billed for the number of events, characteristics of users generating the number of events, and properties of the events.

20. The computer program product of claim 19, wherein the subset of the data is determined at least via decision tree analysis, wherein the number of the events corresponds to a volume of telephonic communications, wherein the characteristics of the users include age, address, education level, and wherein the properties include number of lines and wireless usage.

* * * * *